(12) United States Patent
Marquard et al.

(10) Patent No.: US 10,487,935 B2
(45) Date of Patent: Nov. 26, 2019

(54) DRIVE DEVICE WITH CIRCULATION FILTERING

(71) Applicant: LIEBHERR-COMPONENTS BIBERACH GMBH, Biberach an der Riss (DE)

(72) Inventors: Philipp Marquard, Berg (DE); Roland Widmann, Unlingen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 19 days.

(21) Appl. No.: 15/924,085

(22) Filed: Mar. 16, 2018

(65) Prior Publication Data
US 2018/0238438 A1 Aug. 23, 2018

Related U.S. Application Data

(63) Continuation of application No. PCT/EP2016/001555, filed on Sep. 16, 2016.

(30) Foreign Application Priority Data

Sep. 17, 2015 (DE) ........................ 10 2015 012 132

(51) Int. Cl.
*F16H 57/04* (2010.01)
*E02F 9/20* (2006.01)
(Continued)

(52) U.S. Cl.
CPC ......... *F16H 57/0441* (2013.01); *E02F 9/126* (2013.01); *E02F 9/202* (2013.01);
(Continued)

(58) Field of Classification Search
CPC .. F16H 57/0441; F16H 57/04; F16H 57/0436; F16H 57/0404; F16H 57/031;
(Continued)

(56) References Cited

U.S. PATENT DOCUMENTS 3,550,724 A 12/1970 Vollmer
3,788,167 A * 1/1974 Beaudoin ............ F16H 57/0434
192/219
(Continued)

FOREIGN PATENT DOCUMENTS

CN 203431147 2/2014
DE 19747104 4/1998
(Continued)

*Primary Examiner* — Patrick H Mackey
(74) *Attorney, Agent, or Firm* — Levine Bagade Han LLP

(57) ABSTRACT

The invention relates to a drive device, in particular in the form of a pivot drive for material-transferring devices such as mining excavators, comprising an engine, a transmission that is connected to the engine and is lubricated by a transmission lubricant, and a circulation filter device for filtering the transmission lubricant in circulation, wherein the circulation filter device has at least one circulation pump for circulating the transmission lubricant. According to the invention, the circulation pump is integrated into the transmission, wherein the pump wheel of the circulation pump is configured as a peripheral wheel and is arranged for conjoint rotation with a transmission element.

20 Claims, 3 Drawing Sheets

(51) Int. Cl.
*E02F 9/12* (2006.01)
*F04D 29/18* (2006.01)
*F16H 57/031* (2012.01)

(52) U.S. Cl.
CPC .......... F04D 29/181 (2013.01); F16H 57/031 (2013.01); F16H 57/0404 (2013.01); F16H 57/0436 (2013.01); F16H 57/0482 (2013.01)

(58) Field of Classification Search
CPC ........ F16H 57/0482; E02F 9/20; E02F 9/202; E02F 9/126; F04D 29/181
See application file for complete search history.

(56) References Cited

U.S. PATENT DOCUMENTS

| | | | |
|---|---|---|---|
| 4,468,981 A | 9/1984 | Ries | |
| 4,730,514 A | 3/1988 | Shikata et al. | |
| 4,896,561 A * | 1/1990 | Hayakawa | F16H 57/0421 184/6.12 |
| 5,522,476 A * | 6/1996 | Holman | F16H 57/0456 184/27.1 |
| 5,544,540 A * | 8/1996 | Holman | F04C 15/0061 184/6.12 |
| 6,189,655 B1 * | 2/2001 | Scheib | F16H 57/0434 184/6.12 |
| 6,929,097 B2 * | 8/2005 | Hedman | F16H 57/0494 184/26 |
| 7,699,738 B2 * | 4/2010 | Oomura | F04C 2/10 184/29 |
| 2003/0183564 A1 | 10/2003 | Nguyen et al. | |

FOREIGN PATENT DOCUMENTS

| | | |
|---|---|---|
| DE | 102011003250 | 8/2012 |
| JP | 2001-227623 | 8/2001 |
| JP | 2006-220220 | 8/2006 |
| WO | WO 2015/019813 | 2/2015 |
| WO | WO 2017/045759 | 3/2017 |

* cited by examiner

DRIVE DEVICE WITH CIRCULATION FILTERING

CROSS-REFERENCE TO RELATED APPLICATIONS

The present application is a continuation of International Application No. PCT/EP2016/001555, filed Sep. 16, 2016, which claims priority to German Patent Application No. 10 2015 012 132.4, filed Sep. 17, 2015, both of which are incorporated by reference herein in their entireties.

BACKGROUND

1) Technical Field

The invention relates to a drive device, in particular in the form of a pivot drive for material-transferring devices such as mining excavators, comprising an engine, a transmission that is connected to the engine and is lubricated by a transmission lubricant, and a circulation filter device for filtering the transmission lubricant in circulation, wherein the circulation filter device has at least one circulation pump for circulating and filtering the transmission lubricant.

2) Description of the Related Art

Pivot drives of this type, which usually have a hydraulically driven engine with a transmission that is connected to it and that can be configured as a single- or multi-stage planetary gear, are often used in the slewing gears of excavators, such as mining excavators, crawler excavators, mobile excavators or hydraulic cable excavators, but also occasionally in civil engineering equipment, such as drills, as well as for pitch adjustment in wind turbines, wherein a slewing bearing or sprockets can be driven via the transmission output shaft and/or a driven gear that is attached to it, such as an output pinion, in order to pivot the upper carriage and/or the slewing platform of the device above an upright axis relative to the lower carriage, for example. The engine in drive devices of this type is normally reversible so that the driving direction of the drive device can be reversed without a manual transmission being required.

In this kind of pivot drive, the quality and degree of contamination of the transmission lubricant—usually lubricating oil that may be supplemented with additives—exerts a significant influence on the wear behavior and thus also on the service life of the drive device. In this regard, it is possible to reduce wear and increase the service life by filtering the transmission lubricant and thereby removing contaminants. It is advantageous here to circulate the transmission lubricant and have it flow through a filter in order to conduct all of the lubricant cyclically through the filter.

As a result of the circulation pump that is required for this kind of circulation filtering, however, susceptibility to wear increases again, since the circulation pump itself forms a further sub-assembly and requires additional drive components to operate it, such as gear stages, couplings and the like, which are in turn subject to wear. If the circulation pump or an associated accessory sub-assembly, such as a pump bearing, a spur gear stage for driving the pump or the like, fails, this results in a failure of the entire drive device, and so the service life yielded by the lubricant filtration itself and the correspondingly reduced wear in the transmission will all be nullified by any wear of the additional components of the circulation filter device.

A further problem with the use of circulation pumps of this type arises from the bidirectional driving direction of the pivot drives. If the circulation pump is coupled directly to the hydraulic or electric engine or to the transmission connected to it, the conveying direction of the circulation pump also reverses with the driving direction of the engine, whereby the lubricant is no longer conveyed continuously in the same direction through the filter. Meanwhile, if the circulation pump is no longer coupled to the engine or the transmission but is driven instead by a separate drive, such as an electric drive, then further additional components are again needed, which are themselves associated with an increased susceptibility to wear.

Therefore, the present invention addresses the problem of producing an improved drive device of the aforementioned type, which avoids the disadvantages of the prior art and develops the prior art in an advantageous way. In particular, circulation filtering of the transmission lubricant should be implemented using the fewest possible components that are potentially subject to wear, wherein wear-causing contact between components in particular should be reduced to a minimum.

SUMMARY

As claimed in the invention, this problem is solved by a drive device according to claim 1. Preferred configurations of the invention are the subject matter of the dependent claims.

Thus it is proposed that a separate drive for the circulation pump be omitted and that an elongate, multi-sectional drive train for attaching the circulation pump to the transmission also not be provided, as would be necessary for the external flange-mounting of the circulation pump to the transmission and/or to the engine. According to the invention, the circulation pump is integrated into the transmission, wherein the pump wheel of the circulation pump is arranged for conjoint rotation with a transmission element. Because the circulation pump is arranged in the interior of the transmission and/or forms a part of the transmission and because the pump wheel is rotationally attached to a transmission element, which is already present and provided for the core function of the transmission, it is possible to forgo additional drive train sub-assemblies that are subject to wear, such as additional bearings, spur gear stages or a separate driving motor for driving the circulation pump. The number of components that are potentially susceptible to wear is reduced to a minimum, while the overall size of the drive device does not experience any significant increase, wherein in particular only the overall length of the drive is slightly increased. At the same time, it is possible to do without some structural components of the circulation pump itself, since transmission components perform a double function while also forming a part of the transmission and a part of the circulation pump.

In particular, the circulation pump can be integrated into a section of the housing in a further embodiment of the invention, wherein said housing section can form at least part of a pump chamber, in which the pump wheel is rotatably accommodated, and/or a pump conduit, in which the transmission lubricant transported by the pump wheel is conveyed. In particular, the aforementioned section of housing can form a counterpart to the pump wheel that cooperates with the pump wheel to achieve the conveying effect of the pump. This section of the transmission housing, into which the circulation pump is integrated, can advantageously be formed from a housing or transmission cover, which is detachably connected to the rest of the transmission housing body. In this way, it is possible to provide simple access to the circulation pump for maintenance purposes.

The pump wheel is advantageously configured as a peripheral wheel, which is rotatably accommodated in an annular conveying duct. The annular conveying duct is formed by the aforementioned housing section or is integrated into the housing of the transmission.

This type of peripheral wheel can comprise blades, preferably straight or also curved, which are applied to its circumference and which convey the transmission lubricant through the annular conveying duct when the pump wheel rotates. A conveyor gap, which extends along the peripheral region of the pump wheel and serves as a conveying duct, can be provided between the conveying duct walls formed by the housing section and the blades of the peripheral wheel, wherein a stripper and/or breaker can be provided in the outlet/inlet region such that it can nestle peripherally against the pump wheel with sufficient clearance and interrupts or diverts the annular conveyor gap, so to speak, in order to allow the transmission lubricant circulating in the annular conveying duct to be discharged or to flow out through the pressure outlet and to flow into or be suctioned by a pump inlet, which is separated from the pressure outlet by the aforementioned breaker or stripper. Said breaker or stripper can consist of a different material than the housing, for example a suitable plastic such as PTFE (polytetrafluoroethylene), or can be coated therewith.

However, the aforementioned stripper or breaker can also advantageously be formed from the material of the housing in which the pump wheel is accommodated and/or can form an integral single-part component of the housing.

The peripheral wheel can be guided or mounted in a different way; for example, it can be in contact with thrust washers or can also be distanced from them by a minimal gap or clearance. These thrust washers can guide the peripheral wheel in particular in the axial direction and/or are distanced from the rotary axis of the peripheral wheel on opposite front sides of the peripheral wheel, wherein the thrust washers can be mounted on the housing. Thrust washers of this type can advantageously consist of a friction-reducing and/or lubricating material, such as a suitable plastic like PTFE.

To be able to convey the lubricant equally even when the direction of rotation alternates, as occurs in a pivot drive, the blades of the peripheral wheel can advantageously be configured flat and set radially and in parallel to the axle of the pump wheel.

Advantageously, the pump wheel can be coupled directly to the aforementioned transmission element in a rotationally torque-roof manner without inserting pairs of rolling contact pairs or additional gear wheels. In order to obtain an arrangement that is simple, compact and not susceptible to wear, the pump wheel can be positioned coaxially to the transmission element. By forgoing axle offset and/or angular offset, it is possible to make a direct attachment in the sense of a rotational fixation of the pump wheel to the transmission element so that the pump wheel is speed-synchronous with the transmission element when it rotates, without thereby requiring rolling engagement or the like, which causes wear.

In particular, the pump wheel can be rotatably fastened to the transmission element by synchronization gearing so that it co-rotates with said transmission element. The aforementioned synchronization gearing in this case can have interlocking toothing elements on the transmission element and the pump wheel, which are integrally molded on the pump wheel and on the transmission element, or it can also be rigidly attached to those components in the manner of an initially separate part.

The aforementioned transmission element, to which the pump wheel is directly attached, can be a transmission element lying in the power flux of the transmission, which is not specifically provided to drive the pump wheel but serves instead to transmit the power flux between the input side and the output side of the transmission, i.e. present in the transmission anyway and not specifically provided to drive the circulation pump. This further minimizes the number of components.

If the transmission is configured as a planetary gear comprising at least one planetary stage, the pump wheel can be attached to a transmission element of the planetary stage, i.e. principally to its sun wheel, its planetary carrier or its annulus gear, depending upon which of these transmission elements provides the appropriate rotational speed for the pump wheel and permits a convenient arrangement, based on the transmission design. In order for the pump wheel to be integrated in a simple way into the transmission architecture, especially into the transmission housing, an advantageous development of the invention provides that the pump wheel can be mounted on the sun wheel of the at least one planetary stage.

In an advantageous development of the invention, the pump wheel and/or the entire circulation pump can be arranged coaxially to a central longitudinal axis of the transmission.

Advantageously, the circulation pump can be arranged on an end section of the transmission facing the engine of the drive device, wherein a central drive and/or engine shaft that connects the engine to the transmission can pass through the pump wheel. To this end, the pump wheel can have a central recess, with which the pump wheel can be attached to this shaft by means of the aforementioned synchronization gearing, for example. The aforementioned shaft can form the sun wheel of the at least one planetary stage or can be connected to the sun wheel.

The transmission can also be configured as a multi-stage planetary gear and/or a planetary stage combined with a further, non-planetary stage, depending on the application and installation circumstances the drive device should satisfy. Transmission configurations with no planetary stages at all are also taken into consideration.

In order to have the transmission lubricant circulate in the same circulation direction and/or in order to be able to use only one fixed pressure connection and one fixed suction or inlet connection despite alternating drive directions and the associated changes in the direction of conveyance of the circulation pump, a further embodiment of the invention provides that the circulation pump can have a hydraulic rectifier assigned to it which specifies a fixed pressure outlet and a fixed pressure inlet, regardless of the direction of rotation of the pump, and thus specifies a fixed direction of circulation for the transmission lubricant being conveyed. For example, a rectifier of this type can connect each pump port of the circulation pump both to the pressure outlet and to the return inlet, in each case by means of at least two pressure lines that are connected in parallel, wherein non-return valves and/or check valves or other controllable valves can be provided in the parallel-connected pressure lines in order to connect or interconnect with either the pressure outlet or the return inlet, depending on the pressure conditions in each pump port, i.e. if there is under-pressure or over-pressure.

BRIEF DESCRIPTION OF THE DRAWINGS

Hereafter, the invention is explained in greater detail on the basis of a preferred embodiment and associated drawings. The drawings show.

DETAILED DESCRIPTION

Figure 1:
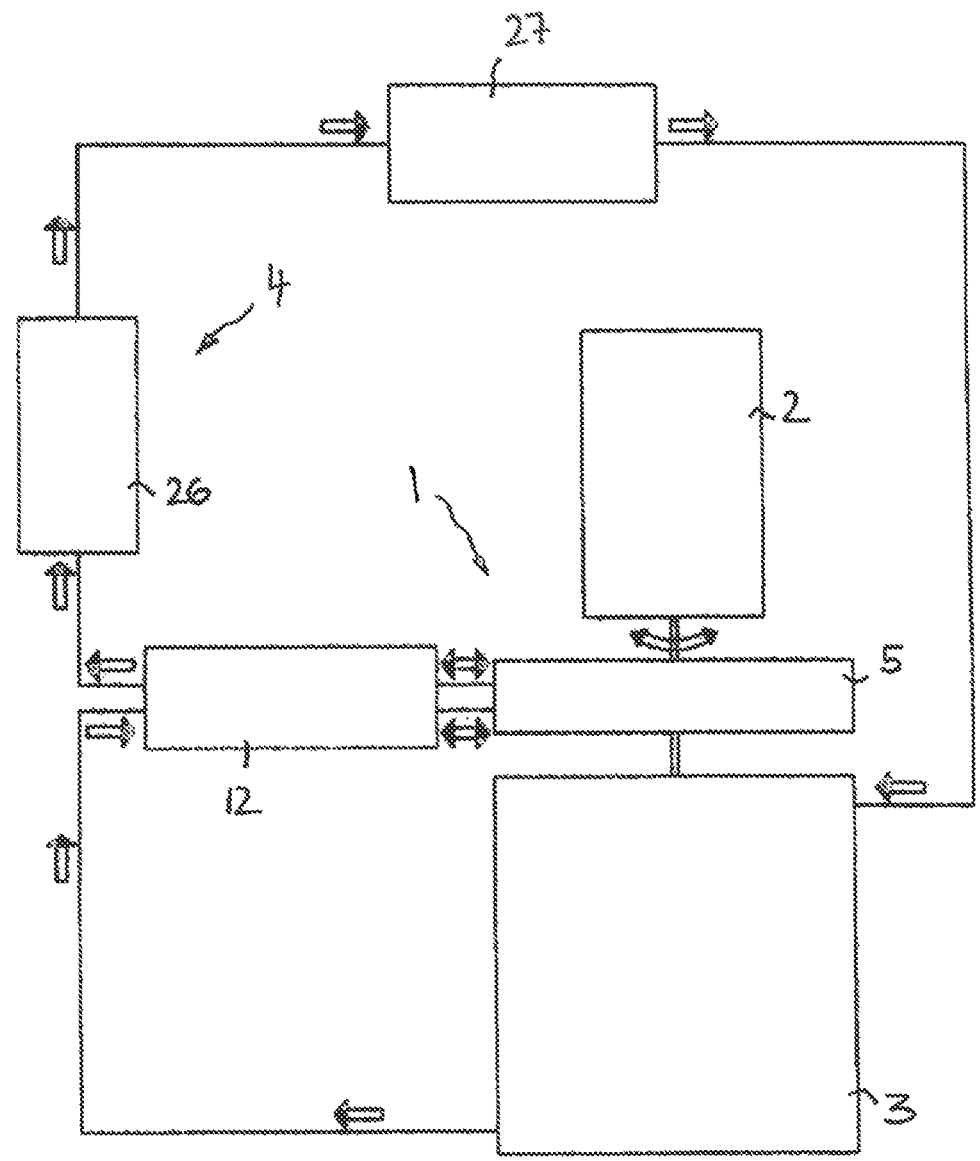
FIG. 1: shows a schematic, significantly simplified block diagram of a drive device according to an advantageous embodiment of the invention which shows the arrangement of the circulation pump between the hydraulic engine and the transmission of the drive device and also shows the hydraulic rectifier assigned to the pump as well as the circulation by the pump of the transmission lubricant.
Figure 4:
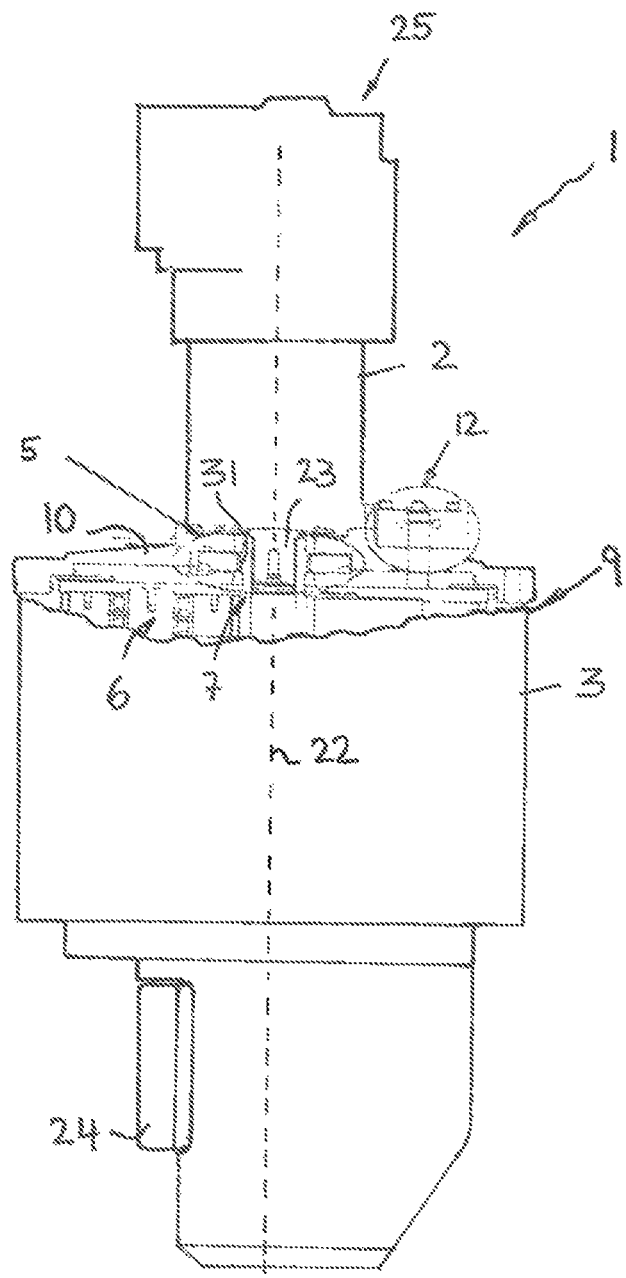
FIG. 4: shows a general view of the drive device with a hydraulic engine and transmission in a partial sectional view, which shows the arrangement of the pump wheel of the circulation pump and the hydraulic rectifier in partial section.

As FIG. 1 shows, the drive device 1 comprises an engine 2 and a transmission 3 that is connected to it, wherein the engine 2 and the transmission 3 can be installed in a mutually coaxial, successive arrangement. An engine output shaft can form the transmission input shaft and vice versa, or a central transmission and/or engine shaft 23 connects the engine 2 with the transmission 3 and defines the central longitudinal axis 22. As FIG. 4 shows, the drive device 1 can form a body that is elongate overall and approximately tower-shaped and that extends along the straight central longitudinal axis 22.

The transmission 3, which is connected to the engine 2 on the input side, has an output pinion 24 on the output side, for example, which can, for example, protrude laterally on the end section of the transmission 3 facing away from the engine 2 or can protrude from the transmission housing 9, for instance in order to intermesh with a large sprocket wheel such as those used on the slewing gear of an excavator. It is understood, however, that other drive elements can also be provided instead of the aforementioned output pinion 24 and can be positioned differently.

If necessary, the drive device 1 can also comprise a braking mechanism 25, which is directly associated with the engine 2, for example, and can be positioned on the front side of the engine 2 facing away from the transmission 3.

The engine 2 is reversible in its direction of rotation and can be configured, for example, as a hydraulic engine, possibly also as an electric engine. The transmission 3 can be considered as a single- or multi-stage planetary gear. As FIG. 4 shows, the engine 2 and the transmission 3 can be connected by a flange-like connection of the engine housing to the transmission housing 9; for instance, the engine housing can be flanged to the front side of the transmission housing 9. A common housing with multiple receiving chambers can also possibly be employed.

As FIG. 1 shows, the transmission lubricant, in particular transmission oil, is spread though the transmission 3, filtered through a circulation filter device 4, wherein the entire quantity of lubricant is gradually circulated through a filter 26 and filtered by it, and a storage container 27, in which the filtered transmission lubricant can collect, can advantageously be arranged downstream of said filter. To be able to circulate the transmission lubricant through the filter 26 and the transmission 3, a circulation pump 5 is provided that can advantageously be arranged in the transition region between the engine 2 and the transmission 3.

In particular, said circulation pump 5 can be integrated into the transmission housing 9, as is shown in FIG. 4. Advantageously, the circulation pump 5 in this case can be integrated into a frontal housing section of transmission 3 facing the engine 2. In particular, this housing section 10 can be a transmission housing cover that is detachably connected to the remaining body of the transmission housing 9; cf. FIG. 4.

Figure 3:
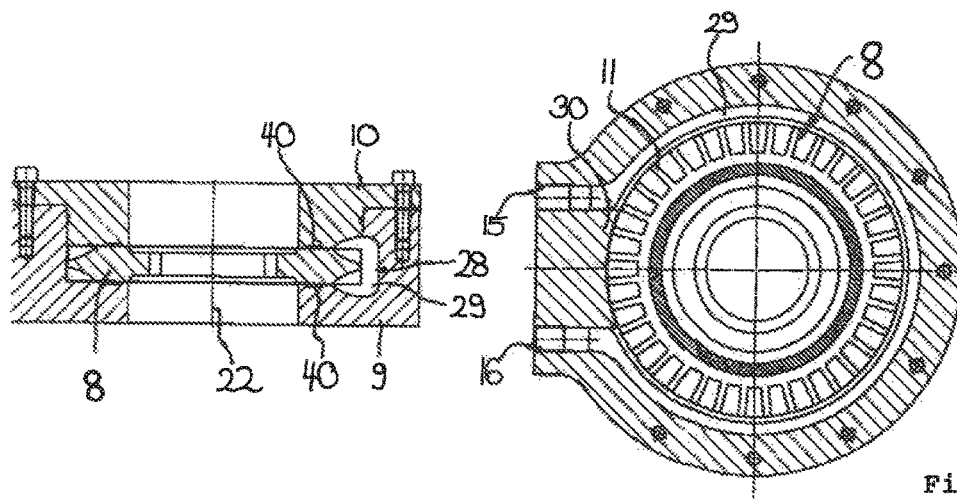
FIG. 3: shows a sectional view of the pump wheel of the circulation pump and its accommodation in a section of the transmission housing according to the preceding figures.

The aforementioned circulation pump 5 is a peripheral wheel pump, the pump wheel 8 of which is configured as a peripheral wheel. As FIG. 3 shows, the pump wheel 8 can have circumferential blades 11 that can protrude toward the circumferential side such that they are exposed radially. In this instance, said blades 11 can be considered substantially flat and extend in planes containing the pump wheel axle, about which the pump wheel 8 revolves; cf. FIG. 3. As a result, a comparable pumping effect can be achieved in both directions of rotation of the pump wheel 8.

As FIG. 3 shows, the pump wheel 8 can be rotatably accommodated in a pump chamber 28, which can be configured as a pocket-shaped recess in the transmission housing 9 and/or in its housing cover 10. As FIG. 3 shows, the pump chamber 28 can be configured substantially as a recess in the shape of an annular groove, which is formed in a cylindrical housing section or collar and is open to the inner side so that the pump wheel 8 can be accommodated within it.

The pump chamber 28 forms an annular conveying duct 29 that extends peripherally around the blades 11 of the pump wheel 8 and ends in two pump ports 15 and 16, which are separated from each other by a contact member 30 that functions as a stripper and/or breaker. As FIG. 3 shows, the contact member 30 can nestle against the outer circumference of the blades 11 as an annular segment section with play, while a gap is left between the blades 11 and the pump chamber wall in the other section of the annular conveying duct 29. Depending on the direction of rotation of the pump wheel 8, one or the other of the two pump ports 15 and 16 functions as a pressure or suction port for the circulation pump 5. The aforementioned breaker in the form of the contact member 30 can advantageously consist of the material of the transmission housing and/or transmission cover 10, and/or it can form an integral component of said transmission housing 9 or transmission cover 10. As FIG. 3 shows, the stripper can be formed from a section of the transmission housing 9, which can protrude upward toward the housing cover 10.

As FIG. 3 shows, the pump wheel 8 can be accommodated in a sandwich-like manner between the transmission housing 9 and its housing cover 10. Independently of this, the pump wheel 8 in the pocket-like recess in the transmission housing 9 or its housing cover 10 can be guided axially through thrust washers 40 that can be arranged on the front side of the pump wheel 8 at a distance from its rotary axis; cf. FIG. 3. Said thrust washers 40 can be fastened to the transmission housing 9 and/or to the housing cover 10, particularly arranged in pockets provided there. Advantageously, these thrust washers 40 can consist of a friction-reducing and/or lubricating material, such as a plastic material, in particular in the form of PTFE.

The pump wheel 8 is rotationally coupled directly to a transmission element of the transmission 3 such that the pump wheel 8 co-rotates with this transmission element. In particular, said transmission element can be the sun wheel 7 of a planetary stage 6, which can be a first planetary stage that is connected to the engine 2; cf. FIG. 4.

The non-rotatable connection between the pump wheel 8 and the sun wheel 7 can be implemented by synchronization gearing 31, for example; cf. FIG. 4

So that there can be a fixed direction of circulation or rotation of the transmission lubricant even when the driving direction alternates, the circulation pump 5 has a hydraulic rectifier 12 assigned to it, which can be disposed, for example, outside on the transmission housing 9, such as on its front side facing the engine 2; cf. FIG. 4.

The rectifier 12 ensures that, regardless of the direction in which the circulation pump 5 is rotating, the pressurized transmission lubricant is always supplied to the same pressure port 13 and, conversely, that the suctioning pump port is always connected with a fixed suction port 14, through which the filtered transmission lubricant flows back. Lubricant can be suctioned out of the transmission here. The return flow of the filtered lubricant can go into the interior of the drive.

Figure 2:
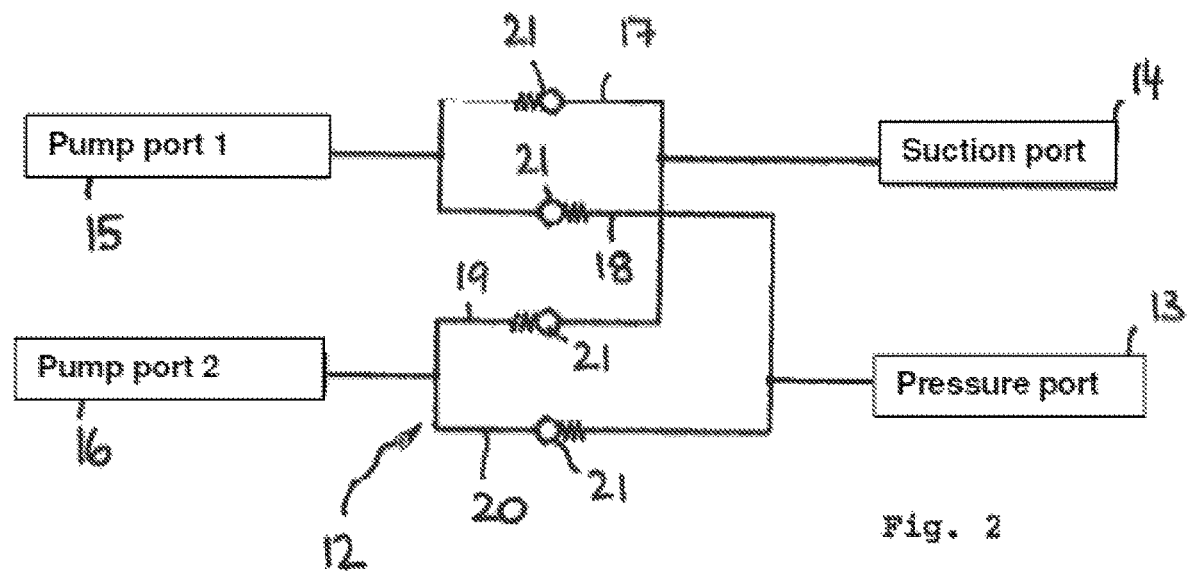
FIG. 2: shows a schematic functional diagram of the hydraulic rectifier according to FIG. 1, which demonstrates the connection of the pump ports with a fixed suction port and a fixed pressure port of the circulation loop via pressure lines that are connected in parallel and the non-return valves provided within them.

As FIG. 2 shows, the aforementioned rectifier 12 can comprise two pairs of pressure lines 17, 18 and 19, 20 that are connected in parallel. A first pair of these parallel-connected pressure lines 17 and 18 connects the first pump port 15 both to the suction port 14 and to the pressure port 13 of the rectifier 12, while the second pair of pressure lines 19 and 20 connects the other pump port 16 likewise both to the suction port 14 and to the pressure port 13 of the rectifier 12. In said pressure lines 17, 18 and 19, 20 are provided check valves, each of which releases only one of the pressure lines of the respective pair of pressure lines, while the other pressure line is blocked. In particular, these check valves can be configured in the form of non-return valves 21 that are oriented in opposite directions to each other. The non-return valves 21 that are provided in the pressure lines 17 and 19 leading to the suction port 14 are arranged such that they block the lines in the direction of the suction port 14 and release the lines from the suction port 14 toward the pump ports 15 and 16. Conversely, the non-return valves 21 that are provided in the pressure lines 18 and 20 leading to the pressure port 13 are arranged such that they release the lines in the direction of the suction port 13 and block the lines to the pump ports 15 and 16.

The invention claimed is:

1. A pivot and/or rotary drive device for material-transferring devices, comprising:
    an engine;
    a transmission connected to the engine and lubricated by a transmission lubricant; and
    a circulation filter device for filtering the transmission lubricant in circulation;
    wherein the circulation filter device has a circulation pump for circulating the transmission lubricant, wherein the circulation pump is integrated into the transmission and comprises a pump wheel arranged for conjoint rotation with a transmission element, in the form of a peripheral wheel that has peripherally provided blades and is accommodated in a pump chamber formed by the transmission housing, and wherein a hydraulic rectifier is connected to the circulation pump and specifies a fixed pressure port and a suction port regardless of the direction of rotation of the circulation pump, and thus specifies a fixed direction of circulation for the transmission lubricant.

2. The drive device of claim 1, wherein the circulation pump is integrated into a section of the transmission housing, and wherein the section of the transmission housing forms at least a part of a pump chamber in which the pump wheel is rotatably accommodated.

3. The drive device according to claim 2, wherein the peripheral wheel is rotatably accommodated in an annular conveying duct which is formed in the section of the transmission housing.

4. The drive device of claim 1, wherein the blades of the peripheral wheel are configured flat and are set radially and in parallel to the axle of the pump wheel such that the peripheral wheel exhibits at least the same pumping performance in opposing directions of rotation.

5. The drive device according to claim 4, wherein the peripheral wheel is rotatably accommodated in an annular conveying duct which is formed in a section of the transmission housing.

6. The drive device of claim 1, wherein the hydraulic rectifier connects each pump port by one pair of parallel-connected pressure lines both to the pressure outlet and to the suction port, and wherein non-return check valves acting in opposite directions are in the pressure lines.

7. The drive device of claim 1, wherein the transmission comprises at least one planetary stage having a sun wheel, and wherein the pump wheel is installed on the sun wheel.

8. The drive device of claim 1, wherein the circulation pump is coaxial with a central longitudinal axis of the drive device.

9. The drive device of claim 1, wherein a direction of rotation of the engine is reversible and/or the circulation pump operates in opposite conveying directions in accordance with the running direction of the engine and/or the transmission.

10. The drive device of claim 1, wherein the engine is a hydraulic engine.

11. The drive device of claim 1, wherein the material-transferring devices are mining excavators.

12. A pivot and/or rotary drive device for material-transferring devices, comprising:
    an engine;
    a transmission connected to the engine and lubricated by a transmission lubricant; and
    a circulation filter device for filtering the transmission lubricant in circulation;
    wherein the circulation filter device has a circulation pump for circulating the transmission lubricant, wherein the circulation pump is integrated into the transmission and comprises a pump wheel arranged for conjoint rotation with a transmission element, in the form of a peripheral wheel that has peripherally provided blades and is accommodated in a pump chamber formed by the transmission housing, and wherein the pump wheel is configured to be coupled directly and coaxially to the transmission element without inserting drive wheels or drive shafts.

13. The drive device of claim 12, wherein the material-transferring devices are mining excavators.

14. The drive device of claim 12, wherein the circulation pump is integrated into a section of the transmission housing, and wherein the section of the transmission housing forms at least a part of a pump chamber in which the pump wheel is rotatably accommodated.

15. The drive device according to claim 14, wherein the peripheral wheel is rotatably accommodated in an annular conveying duct which is formed in the section of the transmission housing.

16. A pivot and/or rotary drive device for material-transferring devices, comprising:
- an engine;
- a transmission connected to the engine and lubricated by a transmission lubricant; and
- a circulation filter device for filtering the transmission lubricant in circulation;
- wherein the circulation filter device has a circulation pump for circulating the transmission lubricant, wherein the circulation pump is integrated into the transmission and comprises a pump wheel arranged for conjoint rotation with a transmission element, in the form of a peripheral wheel that has peripherally provided blades and is accommodated in a pump chamber formed by the transmission housing, and wherein the circulation pump is configured to be arranged on an end section of the transmission facing the engine, and wherein a central drive and/or engine shaft that connects the engine to the transmission can pass through the pump wheel.

17. The drive device of claim 16, wherein the circulation pump is integrated into a removable transmission cover of the transmission housing of the transmission.

18. The drive device of claim 16, wherein the material-transferring devices are mining excavators.

19. The drive device of claim 16, wherein the circulation pump is integrated into a section of the transmission housing, and wherein the section of the transmission housing forms at least a part of a pump chamber in which the pump wheel is rotatably accommodated.

20. The drive device according to claim 19, wherein the peripheral wheel is rotatably accommodated in an annular conveying duct which is formed in the section of the transmission housing.

\* \* \* \* \*